(12) United States Patent
Nagata et al.

(10) Patent No.: US 11,955,291 B2
(45) Date of Patent: Apr. 9, 2024

(54) COMPOSITE CAPACITOR

(71) Applicant: Murata Manufacturing Co., Ltd., Nagaokakyo (JP)

(72) Inventors: Masaki Nagata, Nagaokakyo (JP); Yasuhiro Shimizu, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 233 days.

(21) Appl. No.: 17/659,524

(22) Filed: Apr. 18, 2022

(65) Prior Publication Data
US 2022/0238281 A1  Jul. 28, 2022

Related U.S. Application Data

(63) Continuation of application No. PCT/JP2020/026830, filed on Jul. 9, 2020.

(30) Foreign Application Priority Data

Oct. 24, 2019  (JP) ................. 2019-193612

(51) Int. Cl.
*H01G 4/38* (2006.01)
*H01G 4/008* (2006.01)
*H01G 4/33* (2006.01)

(52) U.S. Cl.
CPC ............. *H01G 4/33* (2013.01); *H01G 4/008* (2013.01); *H01G 4/38* (2013.01)

(58) Field of Classification Search
CPC ............ H01G 4/33; H01G 4/008; H01G 4/38; H01G 4/30; H01G 4/005; H01G 4/08
See application file for complete search history.

(56) References Cited

U.S. PATENT DOCUMENTS

2008/0001253 A1*  1/2008  Mosley ............... H01G 4/38
                                                      257/532
2012/0313591 A1   12/2012  Brambilla et al.
(Continued)

FOREIGN PATENT DOCUMENTS

JP  2003249417 A   9/2003
JP  2006128302 A   5/2006
(Continued)

OTHER PUBLICATIONS

International Search Report issued for PCT/JP2020/026830, dated Sep. 24, 2020.

*Primary Examiner* — Sherman Ng
(74) *Attorney, Agent, or Firm* — Arentfox Shiff LLP

(57) ABSTRACT

A composite capacitor that includes a first capacitor and a second capacitor. Each of plural first columnar conductors and each of plural second columnar conductors have a nano-size outer diameter. The composite capacitor includes a connecting conductor layer and a reinforcement conductor. The reinforcement conductor is located between a first counter electrode layer and a second counter electrode layer of the first capacitor and the second capacitor, respectively, and is connected to each of the first counter electrode layer, the second counter electrode layer, and the connecting conductor layer. The material forming the reinforcement conductor is the same as each of the first counter electrode layer and the second counter electrode layer and is different from the material forming the connecting conductor layer.

11 Claims, 2 Drawing Sheets

(56) References Cited

U.S. PATENT DOCUMENTS

2015/0131205 A1* 5/2015 Amaratunga .......... H01G 11/26
427/80
2018/0151297 A1 5/2018 Hattori et al.

FOREIGN PATENT DOCUMENTS

| | | |
|---|---|---|
| JP | 2014523841 A | 9/2014 |
| JP | 2015519742 A | 7/2015 |
| JP | 2018131381 A | 8/2018 |
| WO | 2017026233 A1 | 2/2017 |

* cited by examiner

COMPOSITE CAPACITOR

CROSS REFERENCE TO RELATED APPLICATIONS

The present application is a continuation of International application No. PCT/JP2020/026830, filed Jul. 9, 2020, which claims priority to Japanese Patent Application No. 2019-193612, filed Oct. 24, 2019, the entire contents of each of which are incorporated herein by reference.

FIELD OF THE INVENTION

The present invention relates to a composite capacitor.

BACKGROUND OF THE INVENTION

Examples of a document that discloses a composite capacitor are Japanese Unexamined Patent Application Publication (Translation of PCT Application) No. 2015-519742 (Patent Document 1) and Japanese Unexamined Patent Application Publication No. 2006-128302 (Patent Document 2). The composite capacitor disclosed in Patent Document 1 includes a first structured surface, a second structured surface, a separator, and an electrolyte. The first and second structured surfaces are carbon-nanotube random arrays. The first and second structured surfaces each include a dielectric coating. The separator is disposed between the first structured surface and the second structured surface. The electrolyte is disposed between the first structured surface and the second structured surface.

The composite capacitor disclosed in Patent Document 2 is a variable capacitor including variable capacitance elements connected in series with each other. In the variable capacitor, a lower electrode layer, a thin-film dielectric layer, and an upper electrode layer are sequentially formed on a support substrate. An extending electrode layer connects the upper electrode layer of a variable capacitance element and the upper electrode layer of another variable capacitance element.

Patent document 1: Japanese Unexamined Patent Application Publication (Translation of PCT Application) No. 2015-519742

Patent document 2: Japanese Unexamined Patent Application Publication No. 2006-128302

SUMMARY OF THE INVENTION

In the composite capacitor disclosed in Patent Document 1, plural capacitors are stacked on each other in the extending direction of carbon nanotubes, which are columnar conductors having a nano-size outer diameter. This makes the overall composite capacitor thick.

To reduce the overall height of a composite capacitor, as the composite capacitor disclosed in Patent Document 2, for plural capacitors having columnar conductors, an extending electrode layer may be formed on upper electrode layers so as to electrically connect the upper electrode layers. It is however difficult for a capacitor having columnar conductors to deform elastically in the extending direction of the columnar conductors. If an extending electrode layer is formed on upper electrode layers in plural capacitors having columnar conductors, when a mounting substrate having the composite capacitor mounted thereon bends, for example, delamination is likely to occur between the extending electrode layer and the upper electrode layers.

The present invention has been made in view of the above-described problems. It is an object of the invention to provide a composite capacitor which can be reduced in the overall height and which can make it less likely to cause delamination.

A composite capacitor according to the present invention includes a first capacitor and a second capacitor connected in series with the first capacitor. The first capacitor includes a first support electrode layer, plural first columnar conductors, a first dielectric layer, and a first counter electrode layer. The plural first columnar conductors extend from the first support electrode layer in a thickness direction of the first support electrode layer, and each of the plural first columnar conductors have a nano-size outer diameter. The first dielectric layer covers the first support electrode layer and the plural first columnar conductors. The first counter electrode layer covers the first dielectric layer and opposes the first support electrode layer and the plural first columnar conductors with the first dielectric layer interposed therebetween. The second capacitor includes a second support electrode layer, plural second columnar conductors, a second dielectric layer, and a second counter electrode layer. The second support electrode layer is disposed adjacent to and separate from the first support electrode layer in an in-plane direction of the first support electrode layer. The plural second columnar conductors extend from the second support electrode layer along an extending direction of the plural first columnar conductors. Each of the plural second columnar conductors have a nano-size outer diameter. The second dielectric layer covers, at a side of the second support electrode layer from which the plural second columnar conductors extend, the second support electrode layer and the plural second columnar conductors. The second counter electrode layer covers the second dielectric layer and opposes the second support electrode layer and the plural second columnar conductors with the second dielectric layer interposed therebetween. A connecting conductor layer is bonded to a first surface of the first counter electrode layer, the first surface being positioned at a side of the first counter electrode layer opposite to the first support electrode layer, and is also bonded to a second surface of the second counter electrode layer, the second surface being positioned at a side of the second counter electrode layer opposite to the second support electrode layer. A reinforcement conductor is located between the first counter electrode layer and the second counter electrode layer. The reinforcement conductor is connected to each of the first counter electrode layer, the second counter electrode layer, and the connecting conductor layer. A material forming the reinforcement conductor is identical to a material forming each of the first counter electrode layer and the second counter electrode layer and is different from a material forming the connecting conductor layer.

According to the present invention, it is possible to reduce the overall height of a composite capacitor and to make it less likely to cause delamination in the composite capacitor.

DETAILED DESCRIPTION OF THE PREFERRED EMBODIMENTS

Figure 1:
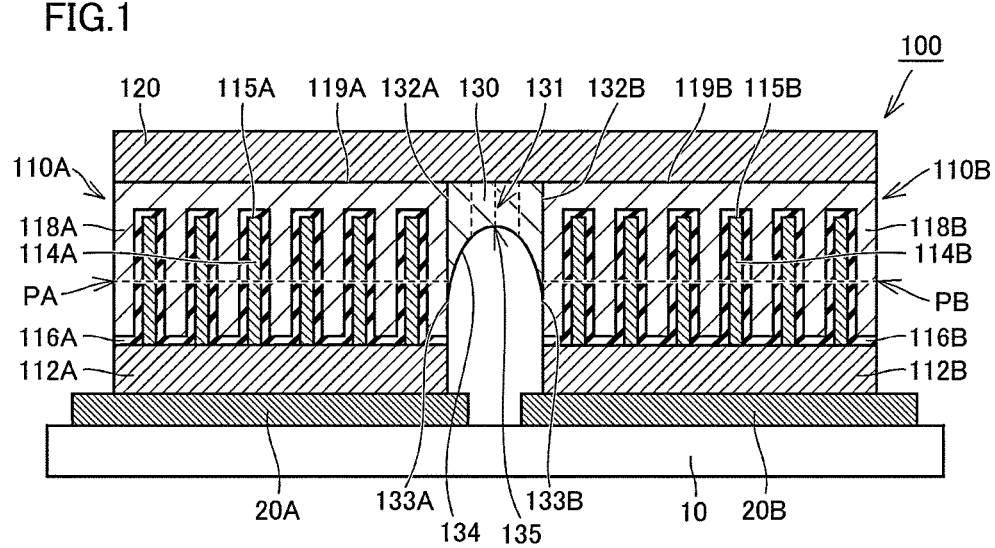
FIG. 1 is a sectional view illustrating a state in which a composite capacitor according to a first embodiment of the invention is mounted on a mounting substrate.

Hereinafter, composite capacitors according to individual embodiments of the present invention will be described below with reference to the drawings. In the following description of the embodiments, identical or corresponding elements will be designated by like reference numeral and an explanation thereof will not be repeated.

First Embodiment

FIG. 1 is a sectional view illustrating a state in which a composite capacitor according to a first embodiment of the invention is mounted on a mounting substrate.

As shown in FIG. 1, a composite capacitor 100 according to the first embodiment of the invention includes a first capacitor 110A and a second capacitor 110B. The composite capacitor 100 is mounted on a mounting substrate 10 with a first solder 20A interposed therebetween on the side of the first capacitor 110A and with a second solder 20B interposed therebetween on the side of the second capacitor 110B.

The first capacitor 110A will first be explained below. As shown in FIG. 1, the first capacitor 110A includes a first support electrode layer 112A, plural first columnar conductors 114A, a first dielectric layer 116A, and a first counter electrode layer 118A.

The first support electrode layer 112A is bonded to the mounting substrate 10 with the solder 20A interposed therebetween, for example. The first support electrode layer 112A may be formed in the shape of a plane, foil, or thin film. The surface of the first support electrode layer 112A may be formed in an uneven shape. The first support electrode layer 112A formed in a planar shape is easy to handle during the manufacturing of the composite capacitor 100 and the composite capacitor 100 is thus easy to design. The first support electrode layer 112A formed in a foil-like shape is easy to handle during the manufacturing of the composite capacitor 100. The first support electrode layer 112A formed in a thin-film-like shape can further reduce the height of the composite capacitor 100.

The external shape and the area of the first support electrode layer 112A as viewed from the thickness direction thereof can suitably be designed in terms of the electrostatic capacity of the first capacitor 110A. The external shape of the first support electrode layer 112A is a rectangle, a substantially rectangle having curved corners, or an ellipse, as viewed from the above-described thickness direction. A hole may be formed in the first support electrode layer 112A as viewed from the above-described thickness direction.

As viewed from the above-described thickness direction, the first support electrode layer 112A may be located farther inward than the first counter electrode layer 118A, which will be discussed later. If the first support electrode layer 112A is located farther inward than the first counter electrode layer 118A, the specific position of the first support electrode layer 112A can be changed suitably in accordance with stress applied from the mounting substrate 10 to the composite capacitor 100.

To improve the mechanical robustness, the first support electrode layer 112A preferably has high symmetrical characteristics as viewed from the above-described thickness direction. For example, as viewed from the above-described thickness direction, the first support electrode layer 112A may have a ring-like external shape or a double-ring-like external shape having concentric two rings.

The first support electrode layer 112A may be formed of multiple layers. If the first support electrode layer 112A is formed of multiple layers stacked on each other, at least one conductor layer forms the first support electrode layer 112A. If the first support electrode layer 112A is formed of multiple layers, it may have a layer different from the conductor layer. This layer may be located on either side of the conductor layer in the above-described thickness direction. This layer may be made of a metal or an insulator. If this layer is made of a metal, the bonding strength with the conductor layer is improved. If this layer is made of an insulator, the bonding strength with the first dielectric layer 116A, which will be discussed later, can be improved when they contact each other.

The material forming the first support electrode layer 112A is not limited to a particular type. For example, the first support electrode layer 112A is made of a metal, such as copper. If the first support electrode layer 112A is formed of multiple layers, the first support electrode layer 112A may be formed of any material if the above-described conductor layer is made of a metal, such as copper.

The plural first columnar conductors 114A are each supported by the first support electrode layer 112A. At one side of the first support electrode layer 112A in the thickness direction thereof, each of the plural first columnar conductors 114A extends from the first support electrode layer 112A along the thickness direction. Although in this embodiment each of the plural first columnar conductors 114A extend from the surface of the first support electrode layer 112A, they may extend outwardly from the inside of the first support electrode layer 112A. Additionally, although in this embodiment each of the plural first columnar conductors 114A are formed of a member different from the first support electrode layer 112A, they may be formed of a uniform member together with the first support electrode layer 112A.

Each of the plural first columnar conductors 114A has a nano-size outer diameter. In the present specification, the nano size is 0.1 nm to 1000 nm, for example. Each of the plural first columnar conductors 114A may have a cylindrical shape or a cylindrical shape with a closed bottom.

The material forming the plural first columnar conductors 114A is not limited to a particular type. In this embodiment, the plural first columnar conductors 114A are made of a conductive material or a semiconductor material. However, the plural first columnar conductors 114A may be formed of columnar members made of a semiconductor material or insulating material thinly coated with a metal.

Each of the plural first columnar conductors 114A includes, for example, carbon nanofibers, another type of nanofibers made of ZnO, for example, or nanorods or nanowires made of ZnO, GaN, or hematite. In this embodiment, specifically, the plural first columnar conductors 114A are formed of carbon nanotubes, and more specifically, each of the plural first columnar conductors 114A is formed of multiple, for example, 100 to 200, carbon nanotubes.

In this embodiment, the chirality of the carbon nanotubes is not limited to a particular type. The carbon nanotubes may be of a semiconductor type or a metal type. The carbon nanotubes may include both of nanotubes of a semiconductor type and those of a metal type. From the viewpoint of the electrical resistance, the carbon nanotubes preferably have a higher ratio of nanotubes of a metal type than those of a semiconductor type.

In this embodiment, the number of layers forming the carbon nanotubes is not particularly restricted. The carbon nanotubes may be of a SWCNT (Single Wall Carbon Nanotube) type formed of one layer or of a MWCNT (Multiwall Carbon Nanotube) type formed of two or more layers.

The length of each of the plural first columnar conductors 114A is not particularly limited. The length of each of the plural first columnar conductors 114A is preferably long from the viewpoint of the capacitance density per unit area in the planar direction perpendicular to the extending direction of the plural first columnar conductors 114A. The length of each of the plural first columnar conductors 114A is several micrometers or longer, 20 µm or longer, 50 µm or longer, 100 µm or longer, 500 µm or longer, 750 µm or longer, 1000 µm or longer, or 2000 µm or longer, for example.

The lengths of the plural first columnar conductors 114A may be different from each other. Forward end portions 115A of the plural first columnar conductors 114A are preferably aligned on a virtual plane substantially perpendicular to a thickness direction. This configuration can easily control the electrostatic capacity of the first capacitor 110A.

As one example of the process for disposing the plural first columnar conductors 114A on the first support electrode layer 112A, the plural first columnar conductors 114A may be grown on a substrate, which is not shown, and then, they may be transferred to the first support electrode layer 112A.

The above-described transferring process will be explained specifically. First, catalyst particles are disposed on the above-described substrate. The first columnar conductors 114A are grown from the surface of the catalyst particles. Each of the plural first columnar conductors 114A is grown such that a growth end portion is separated from the substrate.

Examples of the material forming the substrate are silicon oxide, silicon, gallium arsenide, aluminum, and SUS.

If the first columnar conductors 114A are carbon nanotubes, the catalyst particles are made of Fe, Ni, Co, or an alloy thereof, for example. If the first columnar conductors 114A contain ZnO, the catalyst particles are made of Pt, Au, or an alloy thereof. To dispose the catalyst particles, a combination of one of CVD (Chemical Vapor Deposition), sputtering, and PVD (Physical Vapor Deposition) and one of lithography and etching may be used. The position of the catalyst particles is suitably selected by patterning.

The process for growing the plural first columnar conductors 114A is not restricted to a particular process. In this embodiment, the plural first columnar conductors 114A can be grown by CVD or plasma-enhanced CVD, for example. A gas used in CVD or plasma-enhanced CVD may be carbon monoxide, methane, ethylene, acetylene, or a mixture of such a compound and hydrogen or ammonia.

When the plural first columnar conductors 114A are grown with the above-described CVD or plasma-enhanced CVD, for example, if conditions such as the temperature condition and the gas condition are suitably selected, each of the plural first columnar conductors 114A can be formed to have a length within a desired range and an outer diameter within a desired range. The specific lengths of the plural first columnar conductors 114A become different from each other depending on the gas concentration, gas flow rate, and temperature variations on the surface of the substrate.

The plural first columnar conductors 114A grown in the above-described manner are bonded at their growth end portions onto the first support electrode layer 112A. After the plural first columnar conductors 114A are bonded to the first support electrode layer 112A, the substrate is removed from the plural first columnar conductors 114A. In this manner, the plural first columnar conductors 114A are transferred from the substrate to the first support electrode layer 112A.

The plural first columnar conductors 114A may be transferred from the substrate to the first support electrode layer 112A by chemically or mechanically inserting the growth end portions of the plural first columnar conductors 114A into the first support electrode layer 112A. With this approach, as shown in FIG. 1, the positions of the forward end portions 115A of the plural first columnar conductors 114A can be aligned in the arranging direction of the first columnar conductors 114A.

If each of the plural first columnar conductors 114A is formed of a uniform member together with the first support electrode layer 112A, instead of the above-described process, one planar electrode layer may be used and the surface of the planar electrode layer may be processed in an uneven form by chemical etching, for example, thereby forming the plural first columnar conductors 114A and the first support electrode layer 112A.

At the above-described side of the first support electrode layer 112A in the thickness direction, the first dielectric layer 116A covers the first support electrode layer 112A and the plural first columnar conductors 114A. The first dielectric layer 116A covers the entire surface of the first support electrode layer 112A on the side of the plural first columnar conductors 114A, except for the portions on which the plural first columnar conductors 114A are disposed.

An additional conductor layer may be disposed between the first dielectric layer 116A and the plural first columnar conductors 114A. This can further reduce the parasitic resistance of the first capacitor 110A.

The material forming the first dielectric layer 116A is not limited to a particular type. Examples of the material are silicon dioxide, aluminum oxide, silicon nitride, tantalum oxide, hafnium oxide, barium titanate, lead zirconate titanate, and a combination thereof.

The process for applying the first dielectric layer 116A is not restricted to a particular process, and plating, ALD (Atomic Layer Deposition), CVD, MOCVD (Metalorganic Chemical Vapor Deposition), supercritical fluid film deposition, or sputtering, for example, may be used.

The first counter electrode layer 118A covers the first dielectric layer 116A and opposes the first support electrode layer 112A and the plural first columnar conductors 114A with the first dielectric layer 116A interposed therebetween. In this embodiment, a surface 119A of the first counter electrode layer 118A, which is positioned at the opposite side of the first counter electrode layer 118A as viewed from the first support electrode layer 112A, has a planar shape.

The material forming the first counter electrode layer 118A is not limited to a particular type, and may be a metal, such as silver, gold, copper, platinum, or aluminum, or an alloy thereof.

The process for applying the first counter electrode layer 118A is not restricted to a particular process, and plating, ALD, CVD, MOCVD, supercritical fluid film deposition, or sputtering, for example, may be used.

The second capacitor 110B will now be explained below. As shown in FIG. 1, the second capacitor 110B includes a second support electrode layer 112B, plural second columnar conductors 114B, a second dielectric layer 116B, and a second counter electrode layer 118B. The second capacitor 110B may be configured similarly to the first capacitor 110A, and the second capacitor 110B can be manufactured by a method for manufacturing the first capacitor 110A. That is, the second support electrode layer 112B, the plural second columnar conductors 114B, the second dielectric layer 116B, and the second counter electrode layer 118B of the second capacitor 110B may be configured similarly to the first support electrode layer 112A, the plural first columnar conductors 114A, the first dielectric layer 116A, and the first counter electrode layer 118A, respectively, of the first capacitor 110A.

In the second capacitor 110B, the second support electrode layer 112B is bonded to the mounting substrate 10 with the solder 20B interposed therebetween, for example. The second support electrode layer 112B is disposed adjacent to and separate from the first support electrode layer 112A in the in-plane direction of the first support electrode layer 112A. Each of the plural second columnar conductors 114B has a nano-size outer diameter. The plural second columnar conductors 114B extend from the second support electrode layer 112B along the extending direction of the plural first columnar conductors 114A.

In the second capacitor 110B, as well as in the first capacitor 110A, at the side of the second support electrode layer 112B from which the plural second columnar conductors 114B extend, the second dielectric layer 116B covers the second support electrode layer 112B and the plural second columnar conductors 114B. The second counter electrode layer 118B covers the second dielectric layer 116B and opposes the second support electrode layer 112B and the plural second columnar conductors 114B with the second dielectric layer 116B interposed therebetween.

Hereinafter, the overall configuration of the composite capacitor 100 will be described below. As shown in FIG. 1, the composite capacitor 100 further includes a connecting conductor layer 120 and a reinforcement conductor 130.

The connecting conductor layer 120 is bonded to the surface 119A of the first counter electrode layer 118A, which is positioned at the opposite side of the first counter electrode layer 118A as viewed from the first support electrode layer 112A. The connecting conductor layer 120 is also bonded to a surface 119B of the second counter electrode layer 118B, which is positioned at the opposite side of the second counter electrode layer 118B as viewed from the second support electrode layer 112B. With this configuration, the second capacitor 110B is connected in series with the first capacitor 110A.

The shape and the thickness of the connecting conductor layer 120 are not particularly limited to a specific shape and thickness. The connecting conductor layer 120 may be formed in the shape of a plane, foil, or thin film. The surface of the connecting conductor layer 120 may be formed in an uneven shape. The connecting conductor layer 120 formed in a planar shape is easy to handle during the manufacturing of the composite capacitor 100 and the composite capacitor 100 is thus easy to design. The connecting conductor layer 120 formed in a foil-like shape is easy to handle during the manufacturing of the composite capacitor 100. The connecting conductor layer 120 formed in a thin-film-like shape can further reduce the height of the composite capacitor 100. As the connecting conductor layer 120 is thinner, it is more likely to fuse when an overcurrent flows through the composite capacitor 100, thereby enabling the connecting conductor layer 120 to serve as a fuse.

The external shape of the connecting conductor layer 120 as viewed from the above-described thickness direction is a rectangle, a substantially rectangle having curved corners, or an ellipse. If the corners of the connecting conductor layer 120 as viewed from the thickness direction are curved, stress in the connecting conductor layer 120 is eased and the mechanical robustness is improved. A hole may be formed in the connecting conductor layer 120 as viewed from the thickness direction. To improve the mechanical robustness, the connecting conductor layer 120 preferably has high symmetrical characteristics as viewed from the thickness direction.

As viewed from the above-described thickness direction, the portion of the connecting conductor layer 120 which contacts the first counter electrode layer 118A may be located farther inward than the first counter electrode layer 118A. The portion of the connecting conductor layer 120 which contacts the second counter electrode layer 118B may be located farther inward than the second counter electrode layer 118B.

The connecting conductor layer 120 may have a dumbbell-like external shape. One end portion of the dumbbell is positioned on the surface 119A of the first counter electrode layer 118A, while the other end portion of the dumbbell is positioned on the surface 119B, which is the opposite side of the second counter electrode layer 118B as viewed from the second support electrode layer 112B. That is, the central axis of the dumbbell is located between the first support electrode layer 112A and the second support electrode layer 112B, as viewed from the above-described thickness direction. With this configuration, the portion of the connecting conductor layer 120 corresponding to this central axis can effectively ease stress in the above-described in-plane direction. Additionally, when an overcurrent flows through the composite capacitor 100, the portion of the connecting conductor layer 120 corresponding to this central axis can easily fuse and thus also serve as a fuse.

The material forming the connecting conductor layer 120 is not restricted to a particular type. The connecting conductor layer 120 may be made of a metal, such as copper, a semiconductor material, or a ceramic material. If the connecting conductor layer 120 is made of a metal, the bonding strength with the first counter electrode layer 118A and the second counter electrode layer 118B can be improved. If the connecting conductor layer 120 is made of a semiconductor material, a metal bonding layer may be formed between the connecting conductor layer 120 and each of the first counter electrode layer 118A and the second counter electrode layer 118B in advance. With the provision of the metal bonding layer, the bonding strength between the connecting conductor layer 120 and each of the first counter electrode layer 118A and the second counter electrode layer 118B can be improved. If the connecting conductor layer 120 is made of a ceramic material, which is a relatively hard material, the robustness in response to stress applied from another member can be enhanced.

The reinforcement conductor 130 is located between the first counter electrode layer 118A and the second counter electrode layer 118B. The reinforcement conductor 130 is connected to each of the first counter electrode layer 118A, the second counter electrode layer 118B, and the connecting conductor layer 120.

The reinforcement conductor 130 is made of the same material as the first counter electrode layer 118A and the second counter electrode layer 118B. This can improve the mechanical robustness of the overall composite capacitor 100 and also enhances the efficiency of heat dissipation from the reinforcement conductor 130.

The reinforcement conductor 130 may be formed of a uniform member together with the first counter electrode layer 118A and the second counter electrode layer 118B. If the reinforcement conductor 130 is formed of a uniform member together with the first counter electrode layer 118A and the second counter electrode layer 118B, the manufacturing of the composite capacitor 100 can be facilitated. If the reinforcement conductor 130 is formed of a uniform member together with the first counter electrode layer 118A, the boundary between the first counter electrode layer 118A and the reinforcement conductor 130 is positioned on the side surface of the first support electrode layer 112A closer to the second capacitor 110B and at one side of the above-described thickness direction of the first support electrode layer 112A. If the reinforcement conductor 130 is formed of a uniform member together with the second counter electrode layer 118B, the boundary between the second counter electrode layer 118B and the reinforcement conductor 130 is positioned on the side surface of the second support electrode layer 112B closer to the first capacitor 110A and at one side of the above-described thickness direction of the second support electrode layer 112B. The material forming the reinforcement conductor 130 is different from the material of the connecting conductor layer 120.

In this embodiment, the dimension of an in-plane central portion 131 of the reinforcement conductor 130 in the above-described thickness direction is smaller than the dimension of a first region 132A in the thickness direction where the reinforcement conductor 130 and the first counter electrode layer 118A contact each other and is also smaller than the dimension of a second region 132B in the thickness direction where the reinforcement conductor 130 and the second counter electrode layer 118B contact each other.

In this embodiment, in the above-described thickness direction, an end portion 133A of the first region 132A on the side of the first support electrode layer 112A is positioned closer to the first support electrode layer 112A than the forward end portions 115A of the plural first columnar conductors 114A are. Additionally, the end portion 133A is positioned closer to the first support electrode layer 112A than an average position PA of the centers of the plural first columnar conductors 114A in the above-described thickness direction is.

In this embodiment, in the above-described thickness direction, an end portion 133B of the second region 132B on the side of the second support electrode layer 112B is positioned closer to the second support electrode layer 112B than the forward end portions 115B of the plural second columnar conductors 114B are. Additionally, the end portion 133B is positioned closer to the second support electrode layer 112B than an average position PB of the centers of the plural second columnar conductors 114B in the above-described thickness direction is.

In this embodiment, a surface 134 of the reinforcement conductor 130, which is positioned at the opposite side of the reinforcement conductor 130 as viewed from the connecting conductor layer 120, is curved so as to project toward the connecting conductor layer 120. In this embodiment, when the region between the first capacitor 110A and the second capacitor 110B is divided into four regions in the direction from the first capacitor 110A to the second capacitor 110B, a portion 135 on the surface 134 which is closest to the connecting conductor layer 120 is located within the two central regions of these four regions. More specifically, the portion 135 on the surface 134 which is closest to the connecting conductor layer 120 is positioned at the center between the first capacitor 110A and the second capacitor 110B.

As viewed from the above-described thickness direction, within the region between the first capacitor 110A and the second capacitor 110B, the reinforcement conductor 130 contacts at least part of the first counter electrode layer 118A and at least part of the second counter electrode layer 118B.

The process for forming the reinforcement conductor 130 is not restricted to a particular process, and plating, ALD, CVD, MOCVD, supercritical fluid film deposition, or sputtering, for example, may be used. To form the reinforcement conductor 130 as a uniform member together with the first counter electrode layer 118A and the second counter electrode layer 118B, the reinforcement conductor 130, the first counter electrode layer 118A, and the second counter electrode layer 118B may be formed in the following manner. A member constituted by the first counter electrode layer 118A and the second counter electrode layer 118B continuously disposed in the horizontal direction may be formed and be then ground with a dicer, for example, at the supported side of this member. If the reinforcement conductor 130 is formed in this manner, the shape of the reinforcement conductor 130, that is, the thickness of the reinforcement conductor 130, can easily be adjusted, which further facilitates the adjustment to the equivalent series resistance of the composite capacitor 100.

As shown in FIG. 1, when the composite capacitor 100 of this embodiment is mounted on the mounting substrate 10, the plural first columnar conductors 114A and the plural second columnar conductors 114B extend in the vertical direction with respect to the mounting substrate 10. When a mechanical force is applied to the first capacitor 110A and the second capacitor 110B in the extending direction of the plural first columnar conductors 114A and the plural second columnar conductors 114B, elastic deformation is less likely to occur in the first capacitor 110A and the second capacitor 110B. Because of this configuration, when, due to thermal stress, for example, the mounting substrate 10 having the composite capacitor 100 mounted thereon is curved in a projecting form on the opposite side of the composite capacitor 100, the connecting conductor layer 120 and each of the first counter electrode layer 118A and the second counter electrode layer 118B pull each other, and such a pulling force is concentrated between the connecting conductor layer 120 and each of the first counter electrode layer 118A and the second counter electrode layer 118B. Such a pulling force especially acts on the interface between the connecting conductor layer 120 and the first counter electrode layer 118A and the interface between the connecting conductor layer 120 and the second counter electrode layer 118B which face the portion between the first capacitor 110A and the second capacitor 110B.

In view of this issue, as described above, the composite capacitor 100 according to the first embodiment of the invention includes the reinforcement conductor 130. The reinforcement conductor 130 is located between the first counter electrode layer 118A and the second counter electrode layer 118B. The reinforcement conductor 130 is connected to the first counter electrode layer 118A, the second counter electrode layer 118B, and the connecting conductor layer 120. The material forming the reinforcement conductor 130 is the same as the first counter electrode layer 118A and the second counter electrode layer 118B and is different from the material of the connecting conductor layer 120.

With this configuration, the overall height of the composite capacitor 100 can be reduced, and also, the delamination is less likely to occur between the connecting conductor layer 120 and each of the first counter electrode layer 118A and the second counter electrode layer 118B.

In this embodiment, the dimension of the in-plane central portion 131 of the reinforcement conductor 130 in the above-described thickness direction is smaller than the dimension of the first region 132A in the thickness direction where the reinforcement conductor 130 and the first counter electrode layer 118A contact each other and is also smaller than the dimension of the second region 132B in the thickness direction where the reinforcement conductor 130 and the second counter electrode layer 118B contact each other.

With this configuration, the portion of the reinforcement conductor 130 positioned near the interface between the connecting conductor layer 120 and the first counter electrode layer 118A can firmly connect the connecting conductor layer 120 and the first counter electrode layer 118A, while the portion of the reinforcement conductor 130 positioned near the interface between the connecting conductor layer 120 and the second counter electrode layer 118B can firmly connect the connecting conductor layer 120 and the second counter electrode layer 118B. Additionally, at the central portion 131, the reinforcement conductor 130 can absorb stress acting on the composite capacitor 100 when the mounting substrate 10 is distorted.

In this embodiment, the surface 134 of the reinforcement conductor 130, which is positioned at the opposite side of the reinforcement conductor 130 as viewed from the connecting conductor layer 120, is curved so as to project toward the connecting conductor layer 120.

Since the surface 134 is smoothly curved, the mechanical robustness of the reinforcement conductor 130 is improved.

In this embodiment, when the region between the first capacitor 110A and the second capacitor 110B is divided into four regions in the direction from the first capacitor 110A to the second capacitor 110B, on the surface 134, which is positioned at the opposite side of the reinforcement conductor 130 as viewed from the connecting conductor layer 120, the portion 135 of the surface 134 which is positioned closest to the connecting conductor layer 120 is located within the two central regions of these four regions.

With this configuration, stress acting on the composite capacitor 100 when the mounting substrate 10 bends and is distorted can be absorbed at the portion of the connecting conductor layer 120 which contact the reinforcement conductor 130. This can improve the mechanical robustness of the composite capacitor 100.

In this embodiment, in the above-described thickness direction, the end portion 133A of the first region 132A on the side of the first support electrode layer 112A is positioned closer to the first support electrode layer 112A than the forward end portions 115A of the plural first columnar conductors 114A are. In the above-described thickness direction, the end portion 133B of the second region 132B on the side of the second support electrode layer 112B is positioned closer to the second support electrode layer 112B than the forward end portions 115B of the plural second columnar conductors 114B are.

With this configuration, even when the plural first columnar conductors 114A are curved from the supported side to the end portions 115A and are positioned toward the side surface of the first counter electrode layer 118A and even when the plural second columnar conductors 114B are curved from the supported side to the end portions 115B and are positioned toward the side surface of the second counter electrode layer 118B, the reinforcement conductor 130 can cover the forward end portions 115A of the plural first columnar conductors 114A and the forward end portions 115B of the plural second columnar conductors 114B. It is thus less likely that the composite capacitor 100 is broken in a short-circuiting mode, which may be caused by short-circuiting between any of the above-described forward end portions 115A and 115B and another member.

In this embodiment, the end portion 133A of the first region 132A on the side of the first support electrode layer 112A is positioned closer to the first support electrode layer 112A than the average position PA of the centers of the plural first columnar conductors 114A in the above-described thickness direction is. The end portion 133B of the second region 132B on the side of the second support electrode layer 112B is positioned closer to the second support electrode layer 112B than the average position PB of the centers of the plural second columnar conductors 114B in the above-described thickness direction is.

As a result of forming the reinforcement conductor 130 other than the central portion 131 to be thick, parasitic resistance components in a conductive path connecting the first capacitor 110A and the second capacitor 110B can be reduced.

Second Embodiment

Hereinafter, a composite capacitor according to a second embodiment of the invention will be described below. The composite capacitor according to the second embodiment of the invention is different from the composite capacitor 100 according to the first embodiment of the invention in that it further includes an insulating section. An explanation of elements configured similarly to those of the first embodiment of the invention will not be repeated.

Figure 2:
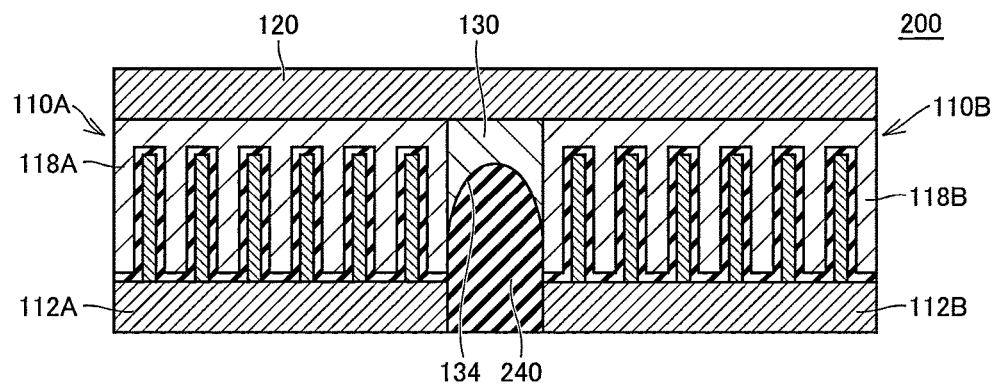
FIG. 2 is a sectional view of a composite capacitor according to a second embodiment of the invention.

FIG. 2 is a sectional view of a composite capacitor according to the second embodiment of the invention. As shown in FIG. 2, a composite capacitor 200 according to the second embodiment of the invention further includes an insulating section 240 disposed in a gap between the first capacitor 110A and the second capacitor 110B. Dielectric breakdown, which may be caused by a short-circuiting mode between the first capacitor 110A and the second capacitor 110B of the composite capacitor 200, is thus less likely to occur in the composite capacitor 200. The mechanical robustness of the composite capacitor 200 can also be improved.

In this embodiment, the insulating section 240 closely contacts the surface 134 of the reinforcement conductor 130. As viewed from the above-described in-plane direction, the portion of the insulating section 240 surrounded by the first capacitor 110A, the second capacitor 110B, and the reinforcement conductor 130 contacts the first support electrode layer 112A, the first counter electrode layer 118A, the second support electrode layer 112B, and the second counter electrode layer 118B.

The material forming the insulating section 240 is not limited to a particular type. An example of the material forming the insulating section 240 is a ceramic material, such as alumina and hafnium.

The process for forming the insulating section 240 is not restricted to a particular process, and plating, ALD, CVD, MOCVD, supercritical fluid film deposition, or sputtering, for example, may be used. The insulating section 240 may be formed by applying a paste material containing an insulating material and then by drying the paste material.

In this embodiment, too, it is possible to reduce the overall height of the composite capacitor 200 by using the reinforcement conductor 130 having a predetermined configuration and also to make it less likely to cause delamination between the connecting conductor layer 120 and each of the first counter electrode layer 118A and the second counter electrode layer 118B.

Hereinafter, composite capacitors according to third through sixth embodiments of the invention will be described below. Each of the composite capacitors according to the third through sixth embodiments of the invention is different from the composite capacitor 100 according to the first embodiment of the invention in the configuration of the external shape of the reinforcement conductor. An explanation of elements configured similarly to those of the first embodiment of the invention will not be repeated.

Third Embodiment

Figure 3:
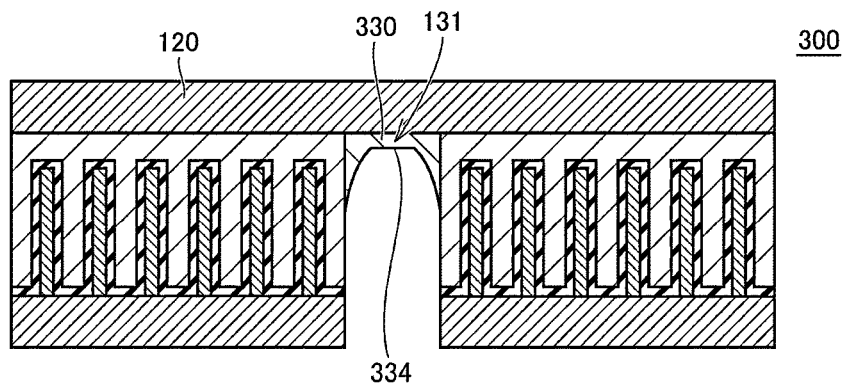
FIG. 3 is a sectional view of a composite capacitor according to a third embodiment of the invention.

FIG. 3 is a sectional view of a composite capacitor according to the third embodiment of the invention. As shown in FIG. 3, in a composite capacitor 300 according to the third embodiment of the invention, at the central portion 131 of a reinforcement conductor 330, a surface 334 of the reinforcement conductor 330, which is positioned at the opposite side of the reinforcement conductor 330 as viewed from the connecting conductor layer 120, is parallel with the above-described in-plane direction.

With this configuration, when a mounting substrate bends and is distorted, the central portion 131 having a uniform thickness of the reinforcement conductor 330 can absorb stress acting on the composite capacitor 300. This further improves the mechanical robustness of the composite capacitor 300. Additionally, the thickness of the central portion 131 can easily be adjusted, which makes it easy to control the value of the equivalent series resistance of the conductive path formed by the reinforcement conductor 330 and the connecting conductor layer 120.

Fourth Embodiment

Figure 4:
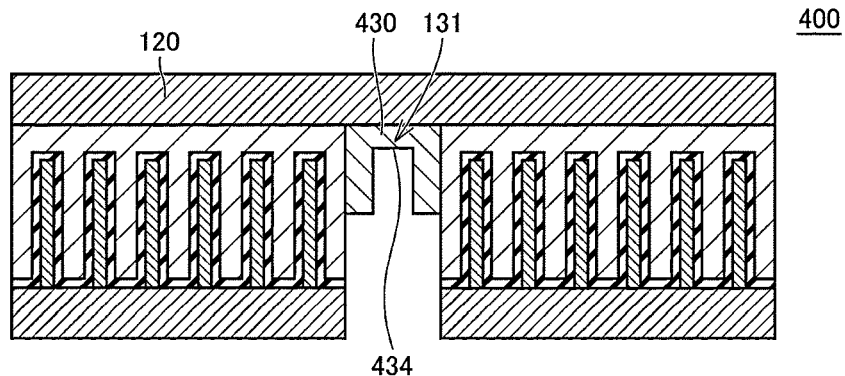
FIG. 4 is a sectional view of a composite capacitor according to a fourth embodiment of the invention.

FIG. 4 is a sectional view of a composite capacitor according to the fourth embodiment of the invention. As shown in FIG. 4, in a composite capacitor 400 according to the fourth embodiment of the invention, a reinforcement conductor 430 has a U-like external shape having a cavity on the side of the support electrode layer. With this configuration, as in the composite capacitor 300 according to the third embodiment of the invention, in the composite capacitor 400 according to the fourth embodiment of the invention, at the central portion 131 of the reinforcement conductor 430, the surface 434 is parallel with the above-described in-plane direction.

Fifth Embodiment

Figure 5:
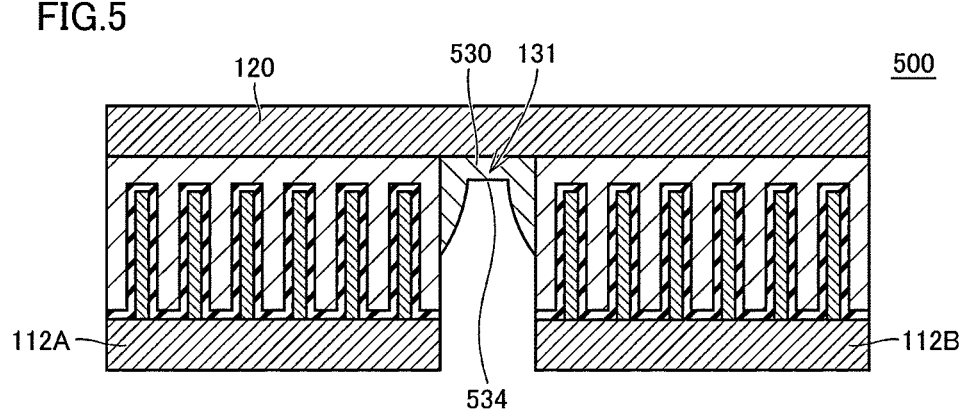
FIG. 5 is a sectional view of a composite capacitor according to a fifth embodiment of the invention.

FIG. 5 is a sectional view of a composite capacitor according to the fifth embodiment of the invention. As shown in FIG. 5, as in the composite capacitor 300 according to the third embodiment of the invention, in a composite capacitor 500 according to the fifth embodiment of the invention, at the central portion 131 of a reinforcement conductor 530, the surface 534 is parallel with the above-described in-plane direction. Moreover, in this embodiment, the surface 534 of the reinforcement conductor 530 other than the central portion 131 is curved to project toward the first support electrode layer 112A and the second support electrode layer 112B.

Sixth Embodiment

Figure 6:
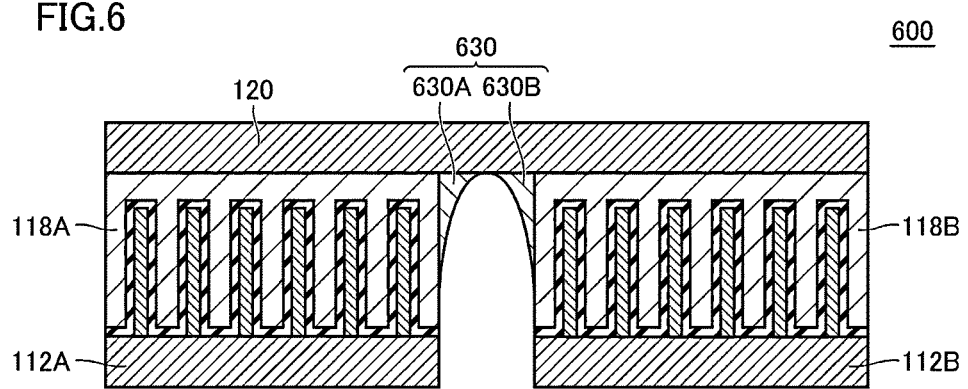
FIG. 6 is a sectional view of a composite capacitor according to a sixth embodiment of the invention.

FIG. 6 is a sectional view of a composite capacitor according to the sixth embodiment of the invention. As shown in FIG. 6, in a composite capacitor 600 according to the sixth embodiment of the invention, a reinforcement conductor 630 includes a first reinforcement conductor 630A and a second reinforcement conductor 630B that are separate from each other. The first reinforcement conductor 630A contacts the first counter electrode layer 118A and the connecting conductor layer 120. The second reinforcement conductor 630B contacts the second counter electrode layer 118B and the connecting conductor layer 120.

In the composite capacitors 300, 400, 500, and 600 according to the third through sixth embodiments of the invention, too, it is possible to reduce the overall heights of the composite capacitors 300, 400, 500, and 600 by using the reinforcement conductors 330, 430, 530, and 630 each having a predetermined configuration and also to make it less likely to cause delamination between the connecting conductor layer 120 and each of the first counter electrode layer 118A and the second counter electrode layer 118B.

In the above-described embodiments, some of the configurations may be combined with each other within a technically possible range.

The above-disclosed embodiments are provided only for the purposes of illustration, but are not intended to be exhaustive or to limit the invention to the precise forms disclosed. It is intended that the scope of the invention be defined, not by the foregoing description, but by the following claims. The scope of the present invention is to be accorded the broadest interpretation so as to encompass all such modifications and equivalent structures and functions.

REFERENCE SIGNS LIST 10 mounting substrate
20A first solder
20B second solder
100, 200, 300, 400, 500, 600 composite capacitor
110A first capacitor
110B second capacitor
112A first support electrode layer
112B second support electrode layer
114A first columnar conductor
114B second columnar conductor
115A, 115B forward end portion
116A first dielectric layer
116B second dielectric layer
118A first counter electrode layer
118B second counter electrode layer
119A, 119B surface
120 connecting conductor layer
130, 330, 430, 530, 630 reinforcement conductor
131 central portion
132A first region
132B second region
133A, 133B end portion
134, 334, 434, 534 surface
135 portion
240 insulating section
630A first reinforcement conductor
630B second reinforcement conductor

The invention claimed is:

1. A composite capacitor comprising:
   a first capacitor including:
      a first support electrode layer;
      a plurality of first columnar conductors that extend from the first support electrode layer in a thickness direction of the first support electrode layer, and each of the plurality of first columnar conductors have a nano-size outer diameter;

a first dielectric layer that covers the first support electrode layer and the plurality of first columnar conductors; and a first counter electrode layer that covers the first dielectric layer and that opposes the first support electrode layer and the plurality of first columnar conductors with the first dielectric layer interposed therebetween;

a second capacitor connected in series with the first capacitor, the second capacitor including:

a second support electrode layer that is disposed adjacent to and separate from the first support electrode layer in an in-plane direction of the first support electrode layer;

a plurality of second columnar conductors that extend from the second support electrode layer along an extending direction of the plurality of first columnar conductors and that each have a nano-size outer diameter;

a second dielectric layer that covers the second support electrode layer and the plurality of second columnar conductors; and a second counter electrode layer that covers the second dielectric layer and that opposes the second support electrode layer and the plurality of second columnar conductors with the second dielectric layer interposed therebetween;

a connecting conductor layer bonded to a first surface of the first counter electrode layer, the first surface being positioned at a side of the first counter electrode layer opposite to the first support electrode layer, and that is also bonded to a second surface of the second counter electrode layer, the second surface being positioned at a side of the second counter electrode layer opposite to the second support electrode layer; and a reinforcement conductor between the first counter electrode layer and the second counter electrode layer and that is connected to each of the first counter electrode layer, the second counter electrode layer, and the connecting conductor layer, wherein a material forming the reinforcement conductor is identical to a material forming each of the first counter electrode layer and the second counter electrode layer and is different from a material forming the connecting conductor layer.

2. The composite capacitor according to claim 1, wherein a dimension of a central portion of the reinforcement conductor in the thickness direction is smaller than a dimension of a first region in the thickness direction where the reinforcement conductor and the first counter electrode layer contact each other and is also smaller than a dimension of a second region in the thickness direction where the reinforcement conductor and the second counter electrode layer contact each other.

3. The composite capacitor according to claim 2, wherein a surface of the reinforcement conductor at an opposite side of the reinforcement conductor as viewed from the connecting conductor layer is curved so as to project toward the connecting conductor layer.

4. The composite capacitor according to claim 2, wherein, when a region between the first capacitor and the second capacitor is divided into four regions in a direction from the first capacitor to the second capacitor, a portion on a surface of the reinforcement conductor at an opposite side of the reinforcement conductor as viewed from the connecting conductor layer positioned closest to the connecting conductor layer is located within two central regions of the four regions.

5. The composite capacitor according to claim 2, wherein, in the thickness direction, an end portion of the first region on the side of the first support electrode layer is positioned closer to the first support electrode layer than forward end portions of the plurality of first columnar conductors, and, in the thickness direction, an end portion of the second region on the side of the second support electrode layer is positioned closer to the second support electrode layer than forward end portions of the plurality of second columnar conductors.

6. The composite capacitor according to claim 5, wherein the end portion of the first region on the side of the first support electrode layer is positioned closer to the first support electrode layer than an average position of centers of the plurality of first columnar conductors in the thickness direction, and the end portion of the second region on the side of the second support electrode layer is positioned closer to the second support electrode layer than an average position of centers of the plurality of second columnar conductors in the thickness direction.

7. The composite capacitor according to claim 1, further comprising:

an insulating section disposed in a gap between the first capacitor and the second capacitor.

8. The composite capacitor according to claim 1, wherein, at the central portion of the reinforcement conductor, a surface of the reinforcement conductor positioned at an opposite side of the reinforcement conductor as viewed from the connecting conductor layer is parallel with the in-plane direction.

9. The composite capacitor according to claim 8, wherein the reinforcement conductor has a U-shape.

10. The composite capacitor according to claim 8, wherein a surface of the reinforcement conductor other than the central portion is curved and projects toward the first support electrode layer and the second support electrode layer.

11. The composite capacitor according to claim 1, wherein the reinforcement conductor includes a first reinforcement conductor and a second reinforcement conductor that are separate from each other, the first reinforcement conductor contacting the first counter electrode layer and the connecting conductor layer, and the second reinforcement conductor contacting the second counter electrode layer and the connecting conductor layer.

* * * * *